(12) United States Patent
Lee et al.

(10) Patent No.: US 8,532,173 B2
(45) Date of Patent: Sep. 10, 2013

(54) METHOD AND APPARATUS FOR PREDICTING VIDEO TRAFFIC

(75) Inventors: Kang Yong Lee, Daejeon (KR); Kee Seong Cho, Daejeon (KR); Byung Sun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 959 days.

(21) Appl. No.: 12/212,720

(22) Filed: Sep. 18, 2008

(65) Prior Publication Data

US 2009/0110061 A1 Apr. 30, 2009

(30) Foreign Application Priority Data

Oct. 24, 2007 (KR) ........................ 10-2007-0107196

(51) Int. Cl.
*G06F 21/00* (2013.01)

(52) U.S. Cl.
USPC ...... 375/240.02; 370/477; 370/338; 382/103; 382/173; 375/240.12; 375/240.15; 375/240.16

(58) Field of Classification Search
USPC ............................................ 375/240, 240.02
See application file for complete search history.

(56) References Cited

U.S. PATENT DOCUMENTS

| | | | | | |
|---|---|---|---|---|---|
| 5,414,779 | A | * | 5/1995 | Mitch ........................... | 382/199 |
| 6,724,823 | B2 | * | 4/2004 | Rovati et al. ............. | 375/240.17 |
| 7,558,760 | B2 | * | 7/2009 | Fang et al. ....................... | 705/57 |
| 2002/0008885 | A1 | * | 1/2002 | Lin et al. ........................ | 358/535 |
| 2007/0036434 | A1 | * | 2/2007 | Saveliev ........................ | 382/173 |
| 2007/0206639 | A1 | * | 9/2007 | Zhao et al. .................... | 370/477 |
| 2007/0223582 | A1 | * | 9/2007 | Borer ......................... | 375/240.12 |
| 2008/0273752 | A1 | * | 11/2008 | Zhu et al. ...................... | 382/103 |

FOREIGN PATENT DOCUMENTS

| | | |
|---|---|---|
| KR | 1020030000935 | 1/2003 |
| KR | 1020030054339 | 7/2003 |

OTHER PUBLICATIONS

Simple and Efficient MPEG-4 Video Traffic Model | http://ieeexplore.ieee.org/stamp/stamp.jsp?tp=&arnumber=1311815 | 2004 | Wan et al.*
Efficient Traffic Prediction Scheme for Real-Time VBR MPEG Video Transmission Over High-Speed Networks|http://ieeexplore.ieee.org/stamp/stamp.jsp?tp=&arnumber=992849|Mar. 2002|Sang-Jo Yoo|pp. 1-9.*
Abdennour, Adel, "Short-term MPEG-4 video traffic prediction using ANFIS," *Int. J. Network Mgmt.*, vol. 15:377-392 (2005).
Adas, Abdelnaser Mohammad, "Using Adaptive Linear Prediction to Support Real-Time VBR Video Under RCBR Network Service Model," *IEEE/ACM Transactions on Networking*, vol. 6(5):635-644 (1998).
Turaga, Deepak S. et al., "On Probability Density for Modeling Video Traffic," *Journal of VLSI Signal Processing*, vol. 34:111-124 (2003).
Korean Office Action for Application No. 10-2007-0107196, dated Jun. 10, 2009.
Wan, Peng et al., "A Simple and Efficient MPEG-4 Video Traffic Model for Wireless Network Performance Evaluation," *2004 IEEE Wireless Communications and Networking Conference*, pp. 1738-1742 (2004).
Korean Notice of Allowance for Application No. 10-2007-0107196, dated Sep. 9, 2009.

* cited by examiner

*Primary Examiner* — Mahfuzur Rahman
(74) *Attorney, Agent, or Firm* — Nelson Mullins Riley & Scarborough LLP

(57) ABSTRACT

A method and apparatus for predicting video traffic are provided. The method includes extracting the statistical properties of previous Moving Picture Experts Group (MPEG)-4 video traffic and predicting the size of a subsequent frame based on the statistical properties of the previous MPEG-4 video traffic. Therefore, it is possible to address such problems associated with traffic bursts as transmission delays or low throughputs and thus to improve the performance of communication and network systems that transmit video traffic.

5 Claims, 4 Drawing Sheets

FIG. 5

| Movie | Type | CS | ANFIS | LMS | NN | %Improv. over ANFIS | %Improv. over LMS | %Improv. over NN |
|---|---|---|---|---|---|---|---|---|
| Aladdin | I | 2.03 | 2.11 | 2.35 | 2.60 | 3.79 | 13.62 | 21.92 |
|  | P | 3.97 | 10.60 | 12.48 | 10.30 | 62.55 | 68.19 | 61.46 |
|  | B | 3.57 | 3.12 | 3.88 | 8.20 | -14.42 | 7.99 | 56.46 |
| ARD Talk | I | 1.12 | 0.77 | 1.76 | 0.90 | -45.45 | 36.36 | -24.44 |
|  | P | 2.59 | 5.03 | 6.10 | 5.90 | 48.51 | 57.54 | 56.10 |
|  | B | 1.41 | 1.12 | 1.42 | 3.20 | -25.89 | 0.70 | 55.94 |
| Jurassic Park I | I | 1.01 | 0.69 | 0.80 | 0.80 | -46.38 | -26.25 | -26.25 |
|  | P | 1.60 | 3.28 | 3.88 | 4.00 | 51.22 | 58.76 | 60.00 |
|  | B | 1.52 | 2.40 | 2.28 | 2.20 | 36.67 | 33.33 | 30.91 |
| Die Hard III | I | 1.98 | 2.90 | 4.41 | 2.90 | 31.72 | 55.10 | 31.72 |
|  | P | 2.52 | 7.25 | 12.30 | 9.00 | 65.24 | 79.51 | 72.00 |
|  | B | 1.59 | 3.55 | 3.44 | 4.00 | 55.21 | 53.78 | 60.25 |
| Lecture Room | I | 0.17 | 0.05 | 0.12 | 0.20 | -240.00 | -41.67 | 15.00 |
|  | P | 1.32 | 3.43 | 4.71 | 6.90 | 61.52 | 71.97 | 80.87 |
|  | B | 1.03 | 1.49 | 2.22 | 28.30 | 30.87 | 53.60 | 96.36 |
| Silence of the Lambs | I | 1.86 | 1.74 | 2.28 | 3.60 | -6.90 | 18.42 | 48.33 |
|  | P | 2.71 | 13.18 | 14.29 | 11.00 | 79.44 | 81.04 | 75.36 |
|  | B | 1.36 | 2.85 | 7.30 | 27.80 | 52.28 | 81.37 | 95.11 |
| Star Wars | I | 1.49 | 1.66 | 2.60 | 1.50 | 10.24 | 42.69 | 0.67 |
|  | P | 6.84 | 10.16 | 14.15 | 9.20 | 32.68 | 51.66 | 25.65 |
|  | B | 1.01 | 0.64 | 1.31 | 3.50 | -57.81 | 22.90 | 71.14 |
| Skiing | I | 1.71 | 2.70 | 3.24 | 2.00 | 36.67 | 47.22 | 14.50 |
|  | P | 1.88 | 3.60 | 4.41 | 6.20 | 47.78 | 57.37 | 69.68 |
|  | B | 1.31 | 1.39 | 1.87 | 14.70 | 5.76 | 29.95 | 91.09 | ab# METHOD AND APPARATUS FOR PREDICTING VIDEO TRAFFIC

This application claims the benefit of Korean Application No. 10-2007-0107196, filed Oct. 24, 2007 in the Korean Intellectual Property Office, the disclosure of which is incorporated herein by reference.

BACKGROUND OF THE INVENTION

1. Field of the Invention

The present invention relates to a method and apparatus for predicting video traffic, and more particularly, to a method and apparatus for predicting video traffic, which can be effectively applied to Moving Picture Experts Group (MPEG)-4 video traffic having variable bit rate (VBR) properties and can thus precisely predict the size of video frames.

The present invention was partly supported by the IT R&D program of Ministry of Information and Communication (MIC) and Institute for Information Technology Advancement (IITA)[Project No.: 2006-S-058-02, Project Title: Development of All IPv6-Based Fixed-Mobile Convergence Networking Technology]

2. Description of the Related Art

Moving Picture Experts Group (MPEG) standards are international standards that define how to compress and represent multimedia data such as audio/video data and include MPEG-1, MPEG-2 and MPEG-4. MPEG-4 can provide higher compression rates than MPEG-1 and MPEG-2. In addition, MPEG-4 treats object elements such as frames and voice data independently and can thus allow users to freely configure frames and voice data.

MPEG-4 video data is classified into an Intra-frame (I-frame), a Predictive-frame (P-frame) and a Bidirectional-Predictive-frame (B-frame). An I-frame is encoded independently of its previous and subsequent frames. A P-frame is encoded or decoded with reference to its previous I-frame or P-frame. That is, a P-frame is encoded in such a manner that the difference between a previous frame and a current frame can be encoded. A B-frame is encoded with reference to at least one of its previous and subsequent P frames.

MPEG video data has a group of pictures (GOP), which is a sequence of frames including P and B frames between a pair of adjacent I-frames. The GOP pattern of MPEG video data is as follows: IBBPBBPBBPBB.

Since MPEG video traffic generally has variable bit rate (VBR) properties and is highly dependent upon the content of video data, traffic bursts are highly likely to occur during the transmission of MPEG video traffic. Such traffic bursts cause transmission delays and deterioration in the performance of communication and network systems.

Therefore, in order to efficiently transmit MPEG video traffic, research has been conducted on ways to model and predict the properties of MPEG video traffic, and various MPEG video traffic prediction methods such as a least mean square (LMS) method and a neural network (NN) method, which is based on artificial intelligence (AI) technology have been developed. These conventional video traffic prediction methods, however, involve very complicated computation processes and are thus difficult to be implemented as communication and network equipment. In addition, these conventional video traffic prediction methods tend to result in high prediction error rates.

SUMMARY OF THE INVENTION

The present invention provides a method and apparatus for predicting video traffic, which can precisely predict the size of video frames of Moving Picture Experts Group (MPEG)-4 video traffic having variable bit rate (VBR) properties by performing simple computations and are easy to be implemented.

According to an aspect of the present invention, there is provided a method of predicting video traffic, the method including classifying input video traffic into a number of types of frames; estimating a probability density function (PDF) regarding the size of the frames; and predicting the size of a subsequent frame using the PDF.

According to another aspect of the present invention, there is provided an apparatus for predicting video traffic, the apparatus including a monitoring unit which classifies input video traffic into a number of types of frames; a statistical property estimation unit which estimates a PDF regarding the size of the frames; and a frame prediction unit which predicts the size of a subsequent frame using the PDF.

According to another aspect of the present invention, there is provided a computer-readable recording medium having recorded thereon a computer program for executing a method of predicting video traffic, the method including classifying input video traffic into a number of types of frames; estimating a PDF regarding the size of the frames; and predicting the size of a subsequent frame using the PDF.

BRIEF DESCRIPTION OF THE DRAWINGS

The above and other features and advantages of the present invention will become more apparent by describing in detail preferred embodiments thereof with reference to the attached drawings in which:

FIG. 5 illustrates a table of simulation results obtained using the method illustrated in FIG. 2.

DETAILED DESCRIPTION OF THE INVENTION

The present invention will hereinafter be described in detail with reference to the accompanying drawings in which exemplary embodiments of the invention are shown.

A method of predicting video traffic according to the present invention can be used in an MPEG-4 video service system for various purposes. More specifically, the method of predicting video traffic according to the present invention can be effectively applied to admission control, bandwidth allocation and congestion control under communication situations where the management of network resources is as critical as in a super high-speed network or a wireless local area network (LAN) and can thus improve the performance of a network.

Figure 1:
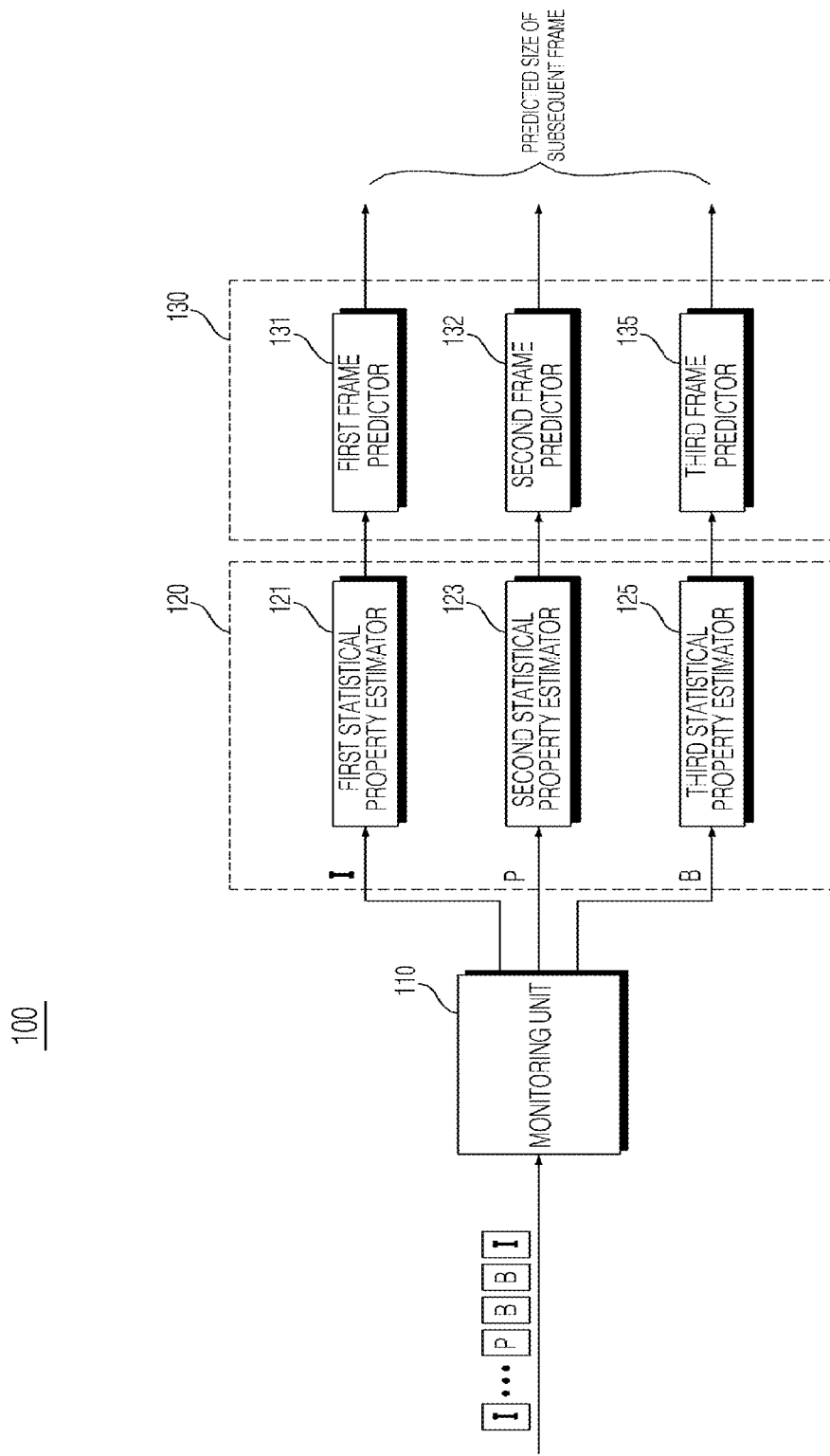
FIG. 1 illustrates a block diagram of an apparatus for predicting video traffic according to an embodiment of the present invention.

FIG. 1 illustrates a block diagram of an apparatus 100 for predicting video traffic according to an embodiment of the present invention. Referring to FIG. 1, the apparatus 100 includes a monitoring unit 110, a statistical property estimation unit 120, and a frame prediction unit 130. The statistical property estimation unit 120 includes first, second and third statistical property estimators 121, 123 and 125, and the frame prediction unit 130 includes first, second and third frame predictors 131, 133 and 135.

The monitoring unit 100 continuously monitors input video traffic and classifies the input video traffic into a number of types of frames such as I-, P-, and B-frames. Thereafter, the monitoring unit 100 transmits the I-, P-, and B-frames to the first, second, and third statistical property estimators 121, 123, and 125, respectively. In general, MPEG video traffic has the following group-of-picture (GOP) pattern: IBBPBBPBBPBB. Thus, it is easy to classify MPEG video traffic into I-, P-, and B-frames.

Each of the first, second and third statistical property estimators 121, 123 and 125 of the statistical property estimation unit 120 stores size information of a number of frames input thereto and estimates the statistical properties of previous video traffic based on the stored size information. More specifically, each of the first, second and third statistical property estimators 121, 123 and 125 may use a probability density function (PDF) to estimate the statistical properties of the previous video traffic.

Each of the first, second and third frame predictors 131, 133 and 135 of the frame prediction unit 130 predicts the size of a subsequent frame based on the statistical properties provided by the first, second and third statistical property estimators 121, 123 and 125.

Figure 2:
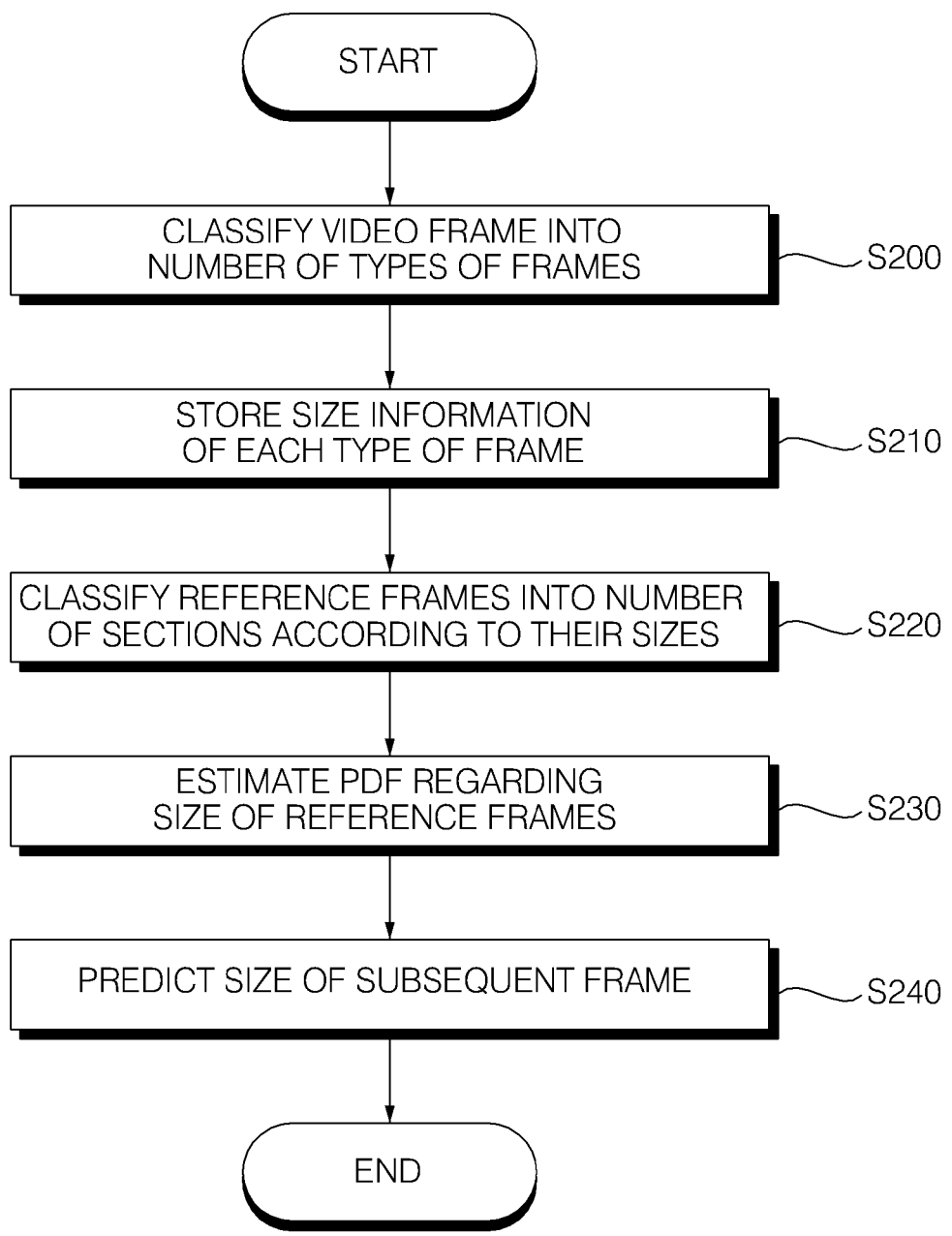
FIG. 2 illustrates a flowchart of a method of predicting video traffic according to an embodiment of the present invention.

FIG. 2 illustrates a flowchart of a method of predicting video traffic according to an embodiment of the present invention. Referring to FIGS. 1 and 2, the monitoring unit 110 classifies input video traffic into I-, P-, and B-frames (S200). The I-, P-, and B-frames are transmitted to the first, second and third statistical property estimators 121, 123 and 125, respectively.

Each of the first, second and third statistical property estimators 121, 123 and 125 stores size information of a number of frames input thereto and sets a total of N frames input thereto as reference frames (S210).

Figure 3:
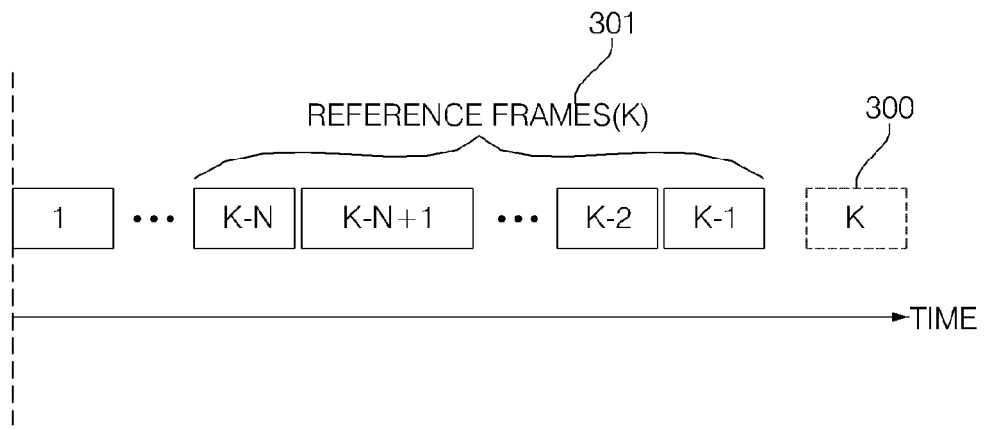
FIGS. 3 and 4 illustrate diagrams for explaining the method illustrated in FIG. 2.

More specifically, referring to FIG. 3, in order to predict the size of a k-th frame 300, a total of N frames ranging from a (k−N)-th frame to a (k−1)-th frame may be used as reference frames (K) 301. The number N of reference frames used to predict the size of the k-th frame may be 5.

Thereafter, the statistical property estimation unit 120 estimates a PDF regarding the size of the N reference frames (S220). That is, in order to predict the size of the k-th frame, a PDF regarding the size of the (k−N)-th through (k−1)-th frames may be estimated, and this will hereinafter be described in detail.

The first, second and third statistical property estimators 121, 123 and 125 classify a plurality of frames into a number of sections according to the sizes of the frames. That is, a maximum frame size $P_{max}$ and a minimum frame size $P_{min}$ are calculated among the N reference frames. Thereafter, referring to FIG. 4, a segment between the maximum frame size $P_{max}$ and the minimum frame size $P_{min}$ is divided into three equal sections: section 1 between $P_1$ and $P_2$, section 2 between $P_2$ and $P_3$ and section 3 between $P_2$ and $P_3$. Thereafter, the N reference frames are classified into sections 1, 2, and 3. For example, a number of reference frames whose size is between $P_1$ and $P_2$ may be classified into section 1. The number of reference frames classified into section i (where i=1, 2 or 3) is defined as $q_i$.

Thereafter, the statistical property estimation unit 120 may estimate a PDF regarding the sizes of the N reference frames by using a cubic-spline interpolation (CSI) method, which is a type of numerical analysis method. Interpolation is a method of approximating discrete points to a single polynomial and is useful for numerical analysis for estimating the function values for data obtained by observations and experiments. Data used to estimate function values is referred to as control points.

Figure 4:
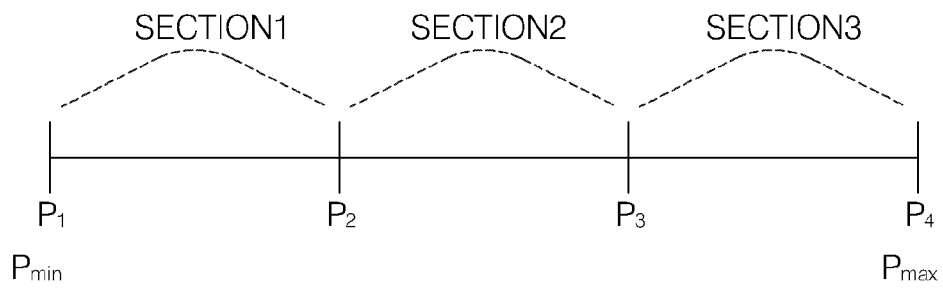

In the embodiment of FIGS. 2 through 4, a function regarding the sizes of the N reference frames may be estimated as a cubic polynomial $f_X(x)$ by using three control points and using the CSI method, and the cubic polynomial $f_X(x)$ may be used as a PDF. A control point $c_i$ may be calculated as indicated by Equation (1):

$$c_i = (x_i, y_i) = \left(\left\lceil \frac{P_{i+1} - P_i}{2} \right\rceil, q_i\right) \quad (1)$$

where i=1, 2 or 3.

In order to predict the size of the k-th frame, the cubic polynomial $f_X(x)$ may be used as a PDF regarding the sizes of the N reference frames. Then, a mean $\mu_k$ and a standard deviation $\sigma_k$ of the sizes of the N reference frames can be easily determined using first and second moments.

Thereafter, the frame prediction unit 130 predicts the size of a subsequent frame (S240). More specifically, the frame prediction unit 130 predicts the size of the k-th frame, as indicated by Equation (2):

$$\overline{I_k} = \mu_{k-1} + \frac{E_{k-1}}{\sigma_{k-2}} \times \sigma_{k-1} \quad (2)$$

where $E_{k-1}$ is a prediction error regarding the (k−1)-th frame, i.e., the difference between the predicted size of the (k−1)-th frame and the actual size of the (k−1)-th frame, $\sigma_{k-1}$ is a standard deviation of the size of the (k−1)-th frame, and $I_k$ is the predicted size of the k-th frame. The prediction error $E_{k-1}$ and the standard deviation $\sigma_{k-1}$ are obtained from the estimation of the size of the (k−1)-th frame.

In this manner, it is possible to relatively easily predict the size of a subsequent frame through statistical estimation based on a number of reference frames.

FIG. 5 illustrates a table of simulation results for comparing the performance of the method of the embodiment of FIGS. 2 through 4 with the performance of conventional video traffic prediction methods. More specifically, FIG. 5 illustrates a table for comparing root mean square errors provided by the method of the embodiment of FIGS. 2 through 4 and root mean square errors provided by conventional video traffic prediction methods such as an adaptive network-based fuzzy interference system (ANFIS) method, a least mean square (LMS) method and a neural network (NN) method. Referring to FIG. 5, reference character 'CS' indicates the method of the embodiment of FIGS. 2 through 4. Referring to FIG. 5, the method of the embodiment of FIGS. 2 through 4 generally can provide more precise prediction results than the ANFIS method, the LMS method and the NN method.

As described above, according to the present invention, it is possible to provide very precise prediction results by performing simple computations. Thus, the present invention can be effectively applied to an environment such as a super high-speed network or a wireless LAN where the management of network resources considerably affects the performance of a whole system. For example, in a IEEE 802.11e wireless LAN, an access point (AP) allocates a transmission opportunity TXOP for transmitting data to each mobile terminal, calculates a service interval (SI), and determines a scheduling algorithm. Scheduling algorithms proposed by the IEEE 802.11e standard are based on the assumption that traffic has a constant bit rate (CBR), rather than a variable bit rate (VBR), and may thus cause deterioration in network performance such as transmission delays or low throughputs.

However, according to the present invention, it is possible to precisely predict the size of subsequent traffic. Therefore, an AP may be able to calculate an optimum TXOP and SI and to determine an optimum scheduling algorithm. Thus, it is possible to improve the performance of a network.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to predict the size of a subsequent frame of MPEG-4 video traffic having variable bit rate (VBR) properties based on the statistical properties of previous traffic by estimating a PDF regarding the size of a previous frame. In addition, it is possible to provide very precise prediction results by performing simple computations. Therefore, the present invention is suitable for efficiently managing and operating network sources. In particular, the present invention is suitable for use in an environment such as a super high-speed network or a wireless LAN where the management of network resources considerably affects the performance of a whole system.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of predicting video traffic, the method comprising:
    classifying input video traffic into a number of types of frames;
    estimating a probability density function (PDF) regarding a size of the frames; and
    predicting a size of a subsequent frame using the PDF,
    wherein the predicting the size of the subsequent frame, comprises calculating the size of the subsequent frame based on a difference between a predicted size of a previous frame and an actual size of the previous frame and a standard deviation of a size of a reference frame,
    wherein the reference frames are classified into a plurality of sections based on the size of the reference frames to define control points, and the PDF regarding the size of the reference frame is estimated using the control points,
    wherein the types of frames comprise an I-frame, a P-frame and a B-frame,
    wherein step of estimating the PDF comprises:
    estimating the PDF regarding a size of the I frame;
    estimating the PDF regarding a size of the P frame; and
    estimating the PDF regarding a size of the B frame.

2. The method of claim 1, wherein the estimating the PDF, comprises estimating the PDF using a cubic-spline interpolation (CSI) method.

3. The method of claim 1, wherein the video traffic is real-time MPEG-4 video traffic having variable bit rate (VBR) properties.

4. A non-transitory computer-readable recording medium storing computer-readable code for predicting video traffic, the computer-readable code comprising code for:
    a monitoring unit which classifies input video traffic into a number of types of frames;
    a statistical property estimation unit which estimates a probability density function (PDF) regarding a size of the frames; and
    a frame prediction unit which predicts a size of a subsequent frame using the PDF,
    wherein the frame prediction unit comprises:
    a first frame predictor which predicts the size of the subsequent frame using the PDF provided by a first statistical property estimator;
    a second frame predictor which predicts the size of the subsequent frame using the PDF provided by a second statistical property estimator; and
    a third frame predictor which predicts the size of the subsequent frame using the PDF provided by a third statistical property estimator,
    wherein reference frames are classified into a plurality of sections based on a size of the reference frames to define control points, and the PDF regarding the size of the reference frames is estimated using the control points,
    wherein the types of frames comprise an I-frame, a P-frame and a B-frame,
    wherein the statistical property estimation unit comprises:
    the first statistical property estimator which estimates the PDF regarding a size of the I frame:
    the second statistical property estimator which estimates the PDF regarding a size of the P frame; and
    the third statistical property estimator which estimates the PDF regarding a size of the B frame.

5. The medium of claim 4, wherein the video traffic is real-time MPEG-4 video traffic having VBR properties.

* * * * *